(12) United States Patent
Purcell et al.

(10) Patent No.: US 6,411,330 B1
(45) Date of Patent: Jun. 25, 2002

(54) METHOD AND A CIRCUIT FOR DETECTING THE PRESENCE OF A TELEVISION OR OTHER DEVICE ON THE OUTPUT OF A VIDEO DIGITAL TO ANALOG CONVERTER

(75) Inventors: John Patrick Purcell, Dooradoyle; Vincent James Troy, Raheen; Kieran Heffernan, Patrickswell, all of (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/095,451

(22) Filed: Jun. 10, 1998

(51) Int. Cl.$^7$ ................................................ H04N 5/225
(52) U.S. Cl. ...................... 348/180; 348/372; 348/553; 348/571
(58) Field of Search ................... 348/553, 554, 348/555, 558, 569, 571, 372, 725, 705, 706, 180, 233, 207; H04N 5/268, 5/262, 5/44, 5/225, 5/445, 5/232

(56) References Cited

U.S. PATENT DOCUMENTS

| 5,331,223 | A | * | 7/1994 | Nishijima |
| 5,550,644 | A | * | 8/1996 | So |
| 5,825,321 | A | * | 10/1998 | Park |
| 5,953,057 | A | * | 9/1999 | Thompson et al. |

FOREIGN PATENT DOCUMENTS

| JP | 62-67470 | * | 3/1987 | ............ H04N/5/44 |
| JP | 6-214936 | * | 8/1994 | ............ G06F/13/14 |
| JP | 6-303477 | * | 10/1994 | .......... H04N/5/225 |

OTHER PUBLICATIONS

Trident Microsystems, Inc., TVXPRESS Technical Reference Manual. Document Rev. 0.4.

* cited by examiner

*Primary Examiner*—David E. Harvey
(74) *Attorney, Agent, or Firm*—Wolf, Greenfield & Sacks, PC

(57) ABSTRACT

A detector circuit (1) for detecting the presence or absence of a television (2) on an output (3) of a video DAC (4) comprises a comparator (11) for comparing a voltage developed by the video signal on a control resistor R2 with a reference voltage of 0.5 volts. The resistor R2 is of 75 ohms and matches the internal impedance R1 of 75 ohms of the television (2). A latch (12) latches the output from the comparator (11) onto an output pin Q when the voltage developed across the control resistor R2 is developed by an equalisation pulse of the vertical blanking interval of the video signal. In the presence of a television (2) the voltage developed across the control resistor R2 is 0.35 volts, which pulls the output of the comparator (11) low, while in the absence of a television (2) the voltage developed across the control resistor R2 is 0.7 volts which pulls the output of the comparator (11) high. A control logic control circuit (21) reads the output pin Q of the latch (12) for powering up or powering down the video DAC (4) as appropriate.

28 Claims, 1 Drawing Sheet

METHOD AND A CIRCUIT FOR DETECTING THE PRESENCE OF A TELEVISION OR OTHER DEVICE ON THE OUTPUT OF A VIDEO DIGITAL TO ANALOG CONVERTER

FIELD OF THE INVENTION

The present invention relates to a method and a circuit for detecting the presence of a television, a video playback and/or recording unit, such as a VCR, or other such device on an output of a video digital to analog converter (DAC). Hereinafter such televisions, video recording and/or playback units and other such devices are referred to as "television devices".

BACKGROUND TO THE INVENTION

With the increasing merging of computer and television technologies, and in particular, the application of digital technology to the transmission and relaying of video signals, video signal output devices are required for converting a digital video or other such signal to an analog output signal which should be suitable for inputting to a television device. Such video signal output devices comprise one or more video DACs, for example, a composite DAC, a luminance DAC, a chrominance DAC and other DACs. It is desirable that where the output of a composite or a luminance DAC is not connected to a television device that the video DAC should be powered down in order to reduce power consumption.

Methods and circuits for determining the presence or absence of a television device connected to an output of a video DAC are known. Such circuits and methods require that the video signal through the video DAC be interrupted, and during the interruption, a constant current signal is forced onto the video DAC output. The voltage on the video DAC output is compared with a reference voltage for determining the presence or absence of a television device on the video DAC output. The results of the comparison are stored, and can be read by the system controller of the video signal output device, and appropriate action taken. Once the comparison of the voltage on the video DAC output with a reference voltage has been made the video DAC can then revert to outputting the video signal. The interruption of the video signal for permitting the constant current signal to be forced onto the video DAC output is undesirable, since in general, it introduces a flicker, which in many cases may be visible on a television output screen. Additionally, any interruption in a video signal causes problems when a video signal is being recorded in a video unit. This, is undesirable.

There is therefore a need for a method and circuit for detecting the presence of a television device on the output of a video DAC.

SUMMARY OF THE INVENTION

According to the invention there is provided a method for detecting the presence of a television device of the type hereinbefore defined on the output of a video digital to analog converter (DAC), the method comprising the steps of:

applying a video output signal from the DAC to a control impedance means for developing a voltage across the control impedance means, comparing the voltage developed across the control impedance means with a reference voltage when the video output signal is of a known level for determining the presence of a television device, and outputting a flag signal for indicating the presence of a television device in response to the presence of a television device being detected.

Preferably, the comparison of the developed voltage across the control impedance means with the reference voltage is made at a predetermined time during a blanking interval, for example, a vertical blanking interval of the video output signal. The blanking interval of a video signal is an interval which contains no video picture data, but rather control signals such as synchronising pulses for synchronising the lines and/or frame of the picture. The vertical blanking interval is the interval which contains serration and equalisation pulses of the video signal.

Advantageously, the predetermined time at which the comparison of the developed voltage across the control impedance means with the reference voltage is made coincides with a portion of a pulse signal in the vertical blanking interval of the video output signal between a rising edge and an adjacent falling edge of the pulse signal.

In one embodiment of the invention the pulse signal is an equalisation pulse in the vertical blanking interval of the video output signal.

Advantageously, the comparison of the developed voltage across the control impedance means with the referenced voltage is made for a first predetermined period. Preferably, the predetermined period lies in the range of 20 clock cycles to 100 clock cycles, where a line of the video output signal is equivalent to 1,716 clock cycle, and advantageously, the predetermined period is approximately 50 clock cycles.

Preferably, the comparison of the developed voltage across the control impedance means with the reference voltage is made at predetermined intervals of the video output signal.

Advantageously, each predetermined interval at which the comparison of the developed voltage across the control impedance means with the reference voltage is made corresponds to a predetermined number of fields of the video output signal.

It is preferable that the comparison of the developed voltage across the control impedance means with the reference voltage is made at least once every eight fields of the video output signal, and preferably, once every two fields of the video output signal.

Preferably, the impedance value of the control impedance means is selected to be a function of the value of the impedance value of the television device, and ideally, the impedance of the control impedance means is selected to be similar to the value of the impedance of the television device.

In one embodiment of the invention the control impedance means is provided by a control resistor connected across the output of the video DAC and ground.

Ideally, the value of the reference voltage is selected so that the voltage developed across the control impedance means lies to one side of the reference voltage when a television device is connected to the output of the video DAC, and lies to the other side of the reference voltage in the absence of a television device.

In another embodiment of the invention the flag signal is read, and the video DAC is powered down in response to the flag signal indicating the absence of a television device on the video DAC output.

Preferably, on being powered down the video DAC is powered up for second predetermined periods at the predetermined times at the predetermined intervals for outputting a portion of the video output signal to the control impedance means for developing the voltage across the control impedance means for comparison thereof with the reference voltage, and powering up the video DAC in response to the flag signal indicating the presence of a television device on the video DAC output.

Additionally, the invention provides a detector circuit for detecting the presence of a television device of the type hereinbefore defined on the output of a video DAC, the circuit comprising:

a control impedance means for connecting to the video DAC output so that a voltage is developed across the control impedance means by a video output signal from the video DAC, a comparing means for comparing the developed voltage across the control impedance means with a reference voltage when the video output signal is of a known level for determining the presence of a television device, and an output means responsive to the comparing means for outputting a flag signal for indicating the presence of a television device.

In one embodiment of the invention a timing means is provided for outputting a control signal for initiating the comparison of the developed voltage across the control impedance means with the reference voltage at a predetermined time during a blanking interval, for example, a vertical blanking interval of the video output signal, the timing means being synchronised with a video input signal to the video DAC.

Preferably, the predetermined time at which the timing means outputs the control signal is at a time which coincides with a portion of a pulse signal in the vertical blanking interval of the video output signal between a rising edge and an adjacent falling edge of the pulse signal.

In one embodiment of the invention the pulse signal is an equalisation pulse in the vertical blanking interval of the video signal.

In another embodiment of the invention the timing means outputs the control signal for a first predetermined period during which the comparison of the developed voltage across the control impedance means with the reference voltage is made. Preferably, the predetermined period lies in the range of 20 clock cycles to 100 clock cycles where the length of a line of the video output signal is equivalent to 1,716 clock cycles. Advantageously, the predetermined period is approximately 50 clock cycles.

Preferably, the timing means outputs the control signal at predetermined intervals of the video output signal.

Advantageously, each predetermined interval corresponds to a predetermined number of fields of the video output signal. Preferably, the timing means outputs the control signal at least once every eight fields of the video output signal, and preferably, at least once every two fields of the video output signal.

In one embodiment of the invention the impedance value of the control impedance means is a function of the value of the impedance of the television device, and preferably, the impedance value of the control impedance means is similar to the value of the impedance of the television device.

In one embodiment of the invention the control impedance means is a control resistor and is adapted for connecting between the output of the video DAC and ground.

Ideally, the value of the reference voltage is selected so that the developed voltage across the control impedance means lies on one side of the reference voltage when a television device is connected to the output of the video DAC, and lies to the other side of the reference voltage in the absence of a television device.

In one embodiment of the invention a control means is provided for powering down the video DAC in response to the flag signal indicating the absence of a television device on the output of the video DAC.

Preferably, the control means in response to the control signals from the timing means powers up the video DAC for second predetermined periods at the predetermined times at the predetermined intervals for outputting a portion of the video signal to the control impedance means for developing the voltage across the control impedance means for comparison thereof with the reference voltage by the comparing means, the control means being responsive to the flag signal indicating the presence of a television device on the output of the video DAC for powering up the video DAC.

The invention further provides a video DAC comprising a detector circuit for detecting the presence of a television device of the type hereinbefore defined on the output of the video DAC, the circuit comprising:

a control impedance means for connecting to the video DAC output so that a voltage is developed across the control impedance means by a video output signal from the video DAC, a comparing means for comparing the developed voltage across the control impedance means with a reference voltage when the video output signal is of a known level for determining the presence of a television device, and an output means responsive to the comparing means for outputting a flag signal for indicating the presence of a television device.

ADVANTAGES OF THE INVENTION

The advantages of the invention are many. By virtue of the fact that the method and the detector circuit use the voltage developed across the control impedance means by the actual video output signal for comparison with the reference voltage, there is no danger of interruption, interference or distortion of the video signal, and accordingly, the comparison of the voltage developed across the control impedance means with the reference voltage is entirely unintrusive and has no visible effect on the television output screen, nor does it have any effect on recording of a video output signal on a VCR. Additionally, by virtue of the fact that the comparison of the voltage developed across the control impedance means with the reference voltage is made when the video output signal is of a known level, for example, during a single pulse in the vertical blanking interval of the video output signal, the value of the voltage developed across the control impedance means can have only one of two values, one for indicating the presence of a television device, and the other for indicating the absence of a television device. By selecting the reference voltage to lie between these two voltage levels, an accurate and simple means for indicating the presence or absence of a television device is provided.

A further important advantage of the invention is that there is no need for the generation of an additional signal to be applied to the video DAC output, since the detection of a television device is carried out by using the video output signal to develop a voltage across the control impedance means. Accordingly, the method and the detector circuit according to the invention for detecting the presence of a television device on the output of a video DAC is a relatively simple and inexpensive method and circuit, which may be implemented with any video DAC at relatively low cost.

The circuit and method for detecting the presence of a television, video unit or other device on an output of a video DAC may be implemented in any video signal output device, such as, for example, a digital video encoder for encoding digital video signals, for example, satellite video signals, video output data from computers and the like.

A particularly important advantage of the invention is achieved when the method and circuit comprise a means for powering up and powering down the video DAC in response to the flag signal since this eliminates the need for manual intervention for powering up and powering down the video DAC depending on whether or not a television device is connected to the video DAC output.

The invention will be more clearly understood from the following description of some preferred embodiments thereof which are given by way of example only with reference to the accompanying drawings.

DESCRIPTION OF PREFERRED EMBODIMENTS OF THE INVENTION

Figure 1:
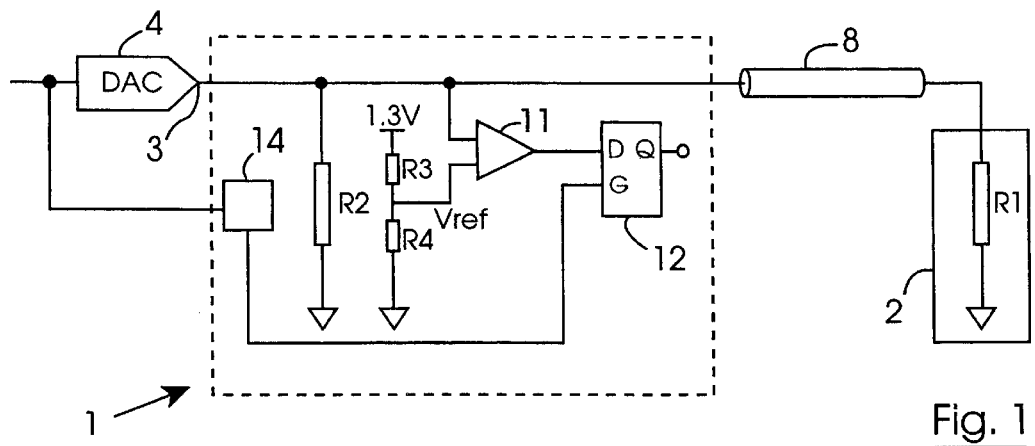
FIG. 1 is a block diagram of a video DAC with a detector circuit according to the invention for detecting the presence of a television on an output of the video DAC, FIGS. 2(a) and (b) are graphical representations of vertical blanking intervals of a video output signal outputted from the video DAC of FIG. 1 between fields 1 and 3 and fields 2 and 4, respectively, of the video output signal.
Figure 2A:
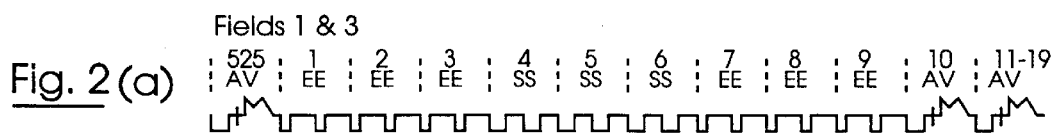
Figure 2B:
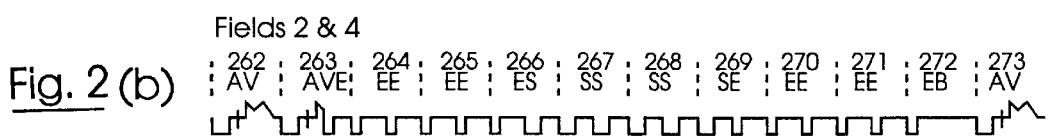

Referring to the drawings and initially to FIGS. 1 and 2(a)–(b) there is illustrated a detector circuit according to the invention which is indicated generally by the reference numeral 1 for detecting the presence of a television 2 on an output 3 of a video DAC 4, in this case a composite video DAC. The video DAC 4 may be a video DAC in any analog video signal output device which feeds an analog video output signal to a television, a video recorder and/or playback unit, such as a VCR or any other television device. Such analog video signal output devices will be well known to those skilled in the art, and may, for example, be a digital video encoder for encoding digital video signals, for example, of the type transmitted by satellite, video output data from a computer, or other such device, and such devices convert a digital video or other signal to an analog video signal which is outputted to a television device. The video DAC 4 outputs an analog video output signal on the output 3 which is relayed through a cable 8 to the television 2. In this embodiment of the invention, the video DAC 4 and the television 2 are suitable for operating to the standard of the National Television Standards Committee (NTSC), and accordingly, the detector circuit 1 is also suitable for operating to the NTSC standard. Although, it will be readily apparent that with minor modifications the detector circuit 1 would be suitable for operating to other standards, for example, the Phase Alternation Line (PAL) standard and other such standards. The television 2 has an internal impedance of approximately 75 ohms which is indicated by the resistor R1.

Turning now to the detector circuit 1 the detector circuit 1 comprises a control impedance means, in this embodiment of the invention a control resistor R2 which is connected across the output 3 of the video DAC 4 and ground. A voltage is developed across the control resistor R2 by the video output signal on the output 3 of the video DAC 4 for comparison with a reference voltage $V_{ref}$ by a comparing means, namely, a comparator 11 for detecting the presence of the television 2 on the output 3 of the video DAC 4 as will be described below. The resistance of the control resistor R2 is matched to the internal impedance R1 of the television 2, and accordingly, is of resistance of 75 ohms. Since the control resistor R2 is connected across the output 3 of the DAC 4 and ground, it is in parallel with the internal impedance of the television 2, namely, the resistor R1 when the television 2 is connected to the output 3 of the DAC 4.

The comparator 11 compares the voltage developed across the control resistor R2 by the video signal with the reference voltage $V_{ref}$, which is of 0.5 volts and is derived, in this case, from a 1.3 volt stable supply through a potential divider formed by resistors R3 and R4. It will of course be appreciated that the reference voltage may be derived from any other suitable stable voltage source. The output of the comparator 11 is fed to an input pin D of a latching means, namely, a latch 12 which latches the output of the comparator 11 onto an output pin Q under the control of a timing means, namely, a timing circuit 14. Thereby, the output pin Q of the latch 12 acts as an output means for providing a flag signal for indicating the presence or absence of the television 2 on the output 3 of the video DAC 4.

The timing circuit 14 is synchronised with a digital video input signal to the video DAC 4, and outputs a control signal at predetermined intervals as will be described below. The control signal is applied to a control pin G of the latch 12 for activating the latch 12 to latch the output of the comparator 11 onto the output pin Q at predetermined times during the vertical blanking intervals of the video output signal when the level of the video signal is known as will be described in detail below with reference to FIGS. 2(a) and (b).

Referring now to FIGS. 2(a) and (b) the vertical blanking intervals of fields 1 and 3 and of fields 2 and 4, respectively, of the video output signal from the DAC 4 are illustrated. The vertical blanking intervals of fields 1 and 3 of the video signal comprise equalisation pulses EE between lines 1 and 3 and lines 7 and 9, while serration pulses SS are provided between lines 4 and 6. In fields 2 and 4 of the video signal equalisation pulses EE are provided in lines 264, 265, 270 and 271, while in lines 267 and 268 serration pulses SS are provided. In lines 266 and 271 serration and equalisation pulses SE and E5 are provided. The provision of such signals in the vertical blanking interval of a video signal will be well known to those skilled in the art and are in accordance with the SMPTE170 M specification (Society of Motion Picture and Television Engineers).

The video signal outputted by the video DAC 4 has a voltage range of 0 volts to 2.6 volts when the output 3 of the video DAC 4 is not connected to the television 2 or any other such device. The output voltage range on the output 3 of the video DAC 4 is halved to a voltage in the range of 0 volts to 1.3 volts when the television 2 is connected from the output 3 of the video DAC 4. This is because the control resistor R2 is in parallel with the internal resistance R1 of the television 2 when the television 2 is connected to the output 3, and the respective resistances of the resistors R1 and R2 are the same, each being 75 ohms. The amplitude of the serration and equalisation pulses in the vertical blanking intervals of the video output signal have an amplitude of 0.7 volts when the output 3 of the video DAC 4 remains unconnected to the television 2 or any other such device. The amplitude of the serration and equalisation pulses is halved to 0.35 volts when the television 2 is connected to the output 3 of the video DAC 4. In other words, the voltage developed across the control resistor R2 is 0.35 volts when the television 2 is connected to the output 3 of the video DAC 4, and is 0.7 volts when the television 2 is disconnected.

The timing circuit 14 outputs the control signal to the control pin G of the latch 12 at the predetermined intervals during the video output signal, which in this embodiment of the invention are once every two fields of the video signal. In this case, the control signal is outputted to the control pin G in the vertical blanking intervals of fields 1 and 3 of the video signal. The control signals are outputted to the control pin G so that the latch 12 latches the output of the comparator 11 while the voltage developed across the control resistor R2 results from the second equalisation pulse of the line 9 of the first and third fields of the video output signal. The timing circuit 14 counts to 1,716 clock cycles for each line of the video output signal, which corresponds to the length of each line. The control signal is outputted at the predetermined time into line 9, which in this embodiment of the invention corresponds to 1,500 clock cycles. The control signal remains active on the control pin G for a first predetermined period of 50 clock cycles so that the latch 12 has sufficient time for latching the output of the comparator 11 resulting from a comparison of the voltage developed across the control resistor R2 by the second equalisation pulse of line 9 with the reference voltage $V_{ref}$. The timing circuit 14 counts at the rate of 27 MHz, and since the length of a line is 63.55 microseconds, therefore, 1,716 clock cycles is equivalent to the length of a line.

When the television 2 is connected to the output 3 of the video DAC 4 the voltage developed across the control resistor R2 by the second equalisation pulse of line 9 is 0.35 volts, which is less than the reference voltage $V_{ref}$ of 0.5 volts, and thus the output on the comparator 11 is low. The low on the output of the comparator 11 is latched by the latch 12 onto the output pin Q, thereby giving a low flag signal indicating the presence of the television 2. On the other hand, should the television 2 be disconnected, and no other such device is connected to the output 3 of the video DAC 4, the voltage developed across the control resistor R2 by the second equalisation pulse of line 9 is 0.7 volts, and thus greater than the reference voltage $V_{ref}$ of 0.5 volts. Thus, the output of the comparator 11 is caused to go high, and the high is in turn latched by the latch 12 onto the output pin Q, thereby providing a high flag signal on the output pin Q, indicating the absence of the television 2. The flag signal on the output pin Q remains high or low, as the case may be until the next comparison made by the comparator 11 after a further predetermined interval of two fields of the video output signal, at which stage the next control signal from the timing circuit 14 on the control pin G activates the latch 2 to latch the output of the comparator 11 resulting from the next comparison onto the output pin Q. The output pin Q may be read by any suitable reading means which would give an appropriate output to indicate that the television 2 is disconnected from the video DAC 4 should this be the case so that appropriate action may be taken for powering down the video DAC 4.

Figure 3:
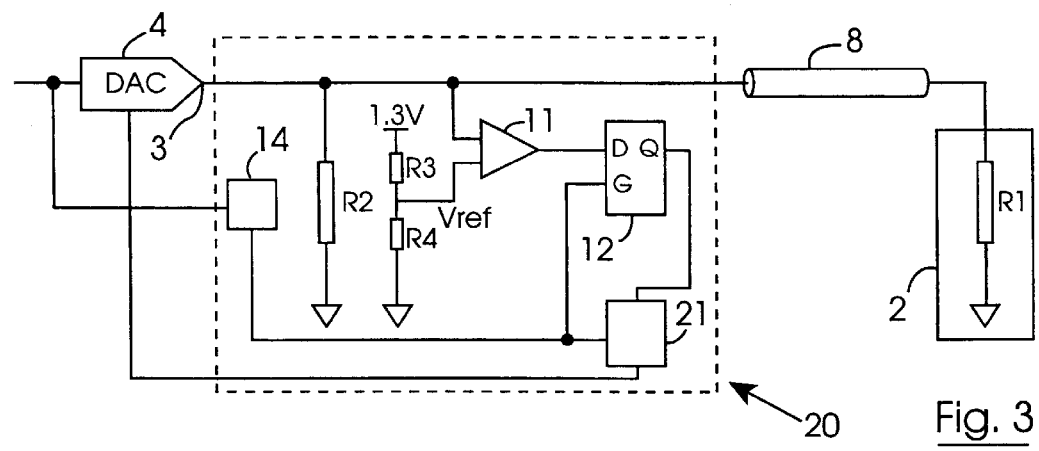
FIG. 3 is a block diagram of a video DAC with a detector circuit according to another embodiment of the invention for detecting the presence of a television on an output of the video DAC, and FIGS. 4(a) and (b) are graphical representations of the output from the video DAC of FIG. 3 while the video DAC is powered down.
Figure 4A:
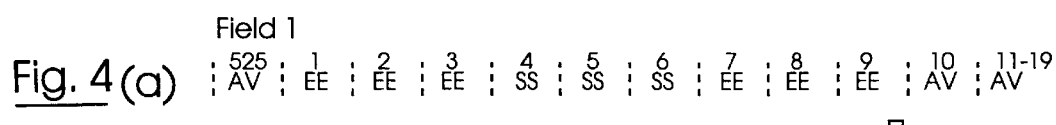
Figure 4B:
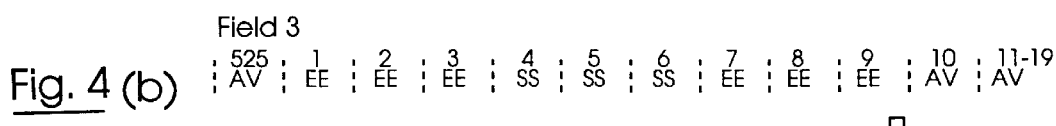

Turning now to FIGS. 3 and 4 there is illustrated a detector circuit according to another embodiment of the invention which is indicated generally by the reference numeral 20, also for detecting the presence of a television on an output of a video DAC. The television and video DAC are similar to the television 2 and video DAC 4 described with reference to FIG. 1, and accordingly, are identified by the same reference numerals, and the parts of the television 2 and video DAC 4 which are similar to those described with reference to FIG. 1 are also indicated by the same reference numerals. Additionally, part of the detector circuit 20 is also similar to the detector circuit 1 and those parts of the detector circuit 20 which are similar to those of a detector circuit 1 are likewise indicated by the same reference numerals. In this embodiment of the invention, the detector circuit 20 comprises a control means which is provided by a control logic circuit 21, which powers up and powers down the video DAC 4 in response to the status of the flag signal on the output pin Q of the latch 12 indicating the presence or absence of a television 2.

The operation of the comparator 11 in comparing the voltage developed across the control resistor R2 with the reference voltage $V_{ref}$ is similar to that described with reference to FIG. 1. The activation of the latch 12 by the control signal applied to the control pin G by the timing circuit 14 for latching the output of the comparator 11 during the second equalisation pulse of line 9 of the first and third fields of the video signal is also similar to that described with reference to FIG. 1. Thus, the flag signal on the output pin Q of the latch 12 is high when the television 2 is disconnected from the video DAC 4, and is low when the television 2 is connected to the output 3 of the video DAC 4. The control logic circuit 21 is activated by the control signal from the timing circuit 14, and on being activated the control logic circuit 21 reads the status of the flag signal on the output pin Q of the latch 12. On reading a low flag signal on the output pin Q of the latch 12 the control logic circuit 21 powers up the video DAC 4 in the event that the video DAC 4 is powered down. Should the control logic circuit 21 read a high flag signal on the output pin Q of the latch 12 the control logic circuit 21 powers down the video DAC 4 if the video DAC 4 is powered up.

However, while the video DAC 4 is powered down the control logic circuit 21 in response to the control signals from the timing circuit 14 powers up the video DAC 4 once every two fields of the video signal for second predetermined periods, which in this embodiment of the invention are similar to the first predetermined periods and are of 50 clock cycles duration at 1,500 clock cycles into line 9 of the first and third fields of the video signal. When powered up for the second predetermined periods the video DAC 4 outputs a portion of the second equalisation pulse of line 9 onto the output 3. The control signal from the timing circuit 14 simultaneously activates the latch 12 for the second predetermined period, namely, for 50 clock cycles duration for latching the output of the comparator 11 onto the output pin Q which is read by the control logic circuit 21. Should the status of the flag signal be low the control logic circuit 21 powers up the video DAC 4, and should the status of the flag signal be high the control logic circuit 21 retains the video DAC 4 powered down.

FIGS. 4(a) and (b) illustrate the output signal appearing on the output 3 of the video DAC 4 during fields 1 and 3 of the video signal while the video DAC is powered down. As can be seen only the portion of the second equalisation pulse of line 9 of the first and third fields of the video signal appears on the output 3 while the video DAC 4 is powered up during the 50 clock cycle period.

In order to avoid cycling of the control logic circuit 21, the control logic circuit 21 does not power down the video DAC 4 until after the 50 clock cycle period has expired. Otherwise, if the control logic circuit 21 were to power down the video DAC 4 before the 50 clock cycle period had expired the voltage developed across the control resistor R2 would drop to zero, thus placing a low on the output of the comparator 11, which would in turn be latched onto the output pin Q of the latch 12. The low on the output pin Q being read by the control logic circuit 21 would cause the control logic circuit 21 to power up the video DAC 4, and the control logic circuit 21 would then commence to cycle between powering up and powering down of the video DAC 4.

While the detector circuits according to the invention have been described for detecting the presence or absence of a television on the output of a video DAC, it will be readily apparent to those skilled in the art that the detector circuit according to the invention could likewise be used for detecting the presence of a video recorder and/or playback unit, for example a VCR, or indeed any other such television or video unit or device.

What is claimed is:

1. A method for detecting the presence of a television device on the output of a video digital to analog converter (DAC), the method comprising the steps of:
   applying a video output signal from the DAC to a control impedance for developing a voltage across the control impedance,
   comparing the voltage developed across the control impedance by the video output signal with a reference voltage at a predetermined time during a pulse signal in a blanking interval of the video output signal, when the video output signal is of a known level for determining the presence of a television device, and
   outputting a flag signal for indicating the presence of a television device in response to the presence of a television device being detected.

2. A method as claimed in claim 1 in which the comparison of the developed voltage across the control impedance with the reference voltage is made during a vertical blanking interval of the video output signal.

3. A method as claimed in claim 2 in which the predetermined time at which the comparison of the developed voltage across the control impedance with the reference voltage is made during a portion of the pulse signal between a rising edge and an adjacent falling edge of the pulse signal.

4. A method as claimed in claim 3 in which the pulse signal is an equalisation pulse in the vertical blanking interval of the video output signal.

5. A method as claimed in claim 1 in which the comparison of the developed voltage across the control impedance means with the referenced voltage is made for a first predetermined period.

6. A method as claimed in claim 1 in which the comparison of the developed voltage across the control impedance means with the reference voltage is made at predetermined intervals of the video output signal.

7. A method as claimed in claim 6 in which each predetermined interval at which the comparison of the developed voltage across the control impedance means with the reference voltage is made corresponds to a predetermined number of fields of the video output signal.

8. A method as claimed in claim 1 in which the impedance value of the control impedance means is selected to be a function of the value of the impedance of the television device.

9. A method as claimed in claim 8 in which the impedance value of the control impedance means is selected to be similar to the value of the impedance of the television device.

10. A method as claimed in claim 1 in which the control impedance means is provided by a control resistor connected across the output of the video DAC and ground.

11. A method as claimed in claim 1 in which the value of the reference voltage is selected so that the voltage developed across the control impedance means lies to one side of the reference voltage when a television device is connected to the output of the video DAC, and lies to the other side of the reference voltage in the absence of a television device.

12. A method as claimed in claim 1 in which the flag signal is read, and the video DAC is powdered down in response to the flag signal indicating the absence of a television device on the video DAC output.

13. A method as claimed in claim 12 in which on being powered down the video DAC is powered up for second predetermined periods at the predetermined times at the predetermined intervals for outputting a portion of the video output signal to the control impedance means for developing the voltage across the control impedance means for comparison thereof with the reference voltage, and powering up the video DAC in response to the flag signal indicating the presence of a television device on the video DAC output.

14. A detector circuit for detecting the presence of television device on the output of a video DAC, the circuit comprising:
   a control impedance for connecting to the video DAC output so that a voltage is developed across the control impedance by a video output signal from the video DAC,
   a comparator which compares the developed voltage across the control impedance means with a reference voltage for determining the presence of a television device,
   a timing means for outputting a control signal for initiating the comparison of the developed voltage across the control impedance with the reference voltage at a predetermined time during a pulse signal in a blanking interval of the video output signal when the video output signal is of a known level, and
   an output circuit responsive to the comparator and outputting a flag signal indicating the presence of a television device.

15. A detector circuit as claimed in claim 14 in which the timing mean is synchronised with video input signal to the video DAC.

16. A detector circuit as claimed in claim 15 in which the predetermined time at which the timing means outputs the control signal is during a vertical blanking interval of the video output signal.

17. A detector circuit as claimed in claim 16 in which the predetermined time at which the timing means outputs the control signal is at a time which coincides with a portion of the pulse signal in the vertical blanking interval of the video output signal between a rising edge and an adjacent falling edge of the pulse signal.

18. A detector circuit as claimed in claim 16 in which the pulse signal is an equalisation pulse in the vertical blanking interval of the video signal.

19. A detector circuit as claimed in claim 15 in which the timing means outputs the control signal for a first predetermined period during which the comparison of the developed voltage across the control impedance means with the reference voltage is made.

20. A detector circuit as claimed in claim 15 in which the timing means outputs the control signal at predetermined intervals of the vide output signal.

21. A detector circuit as claimed in claim 20 in which each predetermined interval corresponds to a predetermined number of fields of the video output signal.

22. A detector circuit as claimed in claim 14 in which the impedance value of the control impedance means is a function of the value of the impedance of the television device.

23. A detector circuit as claimed in claim 22 in which the impedance value of the control impedance means is similar to the value of the impedance of the television device.

24. A detector circuit as claimed in claim 14 in which the control impedance means is a control resistor and is adapted for connecting between the output of the video DAC and ground.

25. A detector circuit as claimed in claim 14 in which the value of the reference voltage is selected so that the developed voltage across the control impedance means lies on one side of the reference voltage when a television device is connected to the output of the video DAC, and lies to the other side of the reference voltage in the absence of a television device.

26. A detector circuit as claimed in claim 14 in which a control means is provided for powering down the video DAC in response to the flag signal indicating the absence of a television device on the output of the video DAC.

27. A detector circuit as claimed in claim 26 in which the control means in response to the control signals from the timing means powers up the video DAC for second predetermined periods at the predetermined times at the predetermined intervals for outputting a portion of the video signal to the control impedance means for developing the voltage across the control impedance means for comparison thereof with the reference voltage by the comparing means, the control means being responsive to the flag signal indicating the presence of a television device on the output of the video DAC for powering up the video DAC.

28. A video DAC comprising a detector circuit for detecting the presence of a television device on the output of the video DAC, the circuit comprising:

a control impedance for connecting to the video DAC output so that a voltage is developed across the control impedance by a video output signal from the video DAC, a comparator which compares the developed voltage across the control impedance with a reference voltage and determines the presence of a television device, a timing means for outputting a control signal for initiating the comparison of the developed voltage across the control impedance with the reference voltage at a predetermined time during a pulse signal in a blanking interval of the video output signal when the video output signal is of a known level, and an output circuit responsive to the comparator and outputting a flag signal indicating the presence of a television device.

* * * * *